US012713412B2

(12) United States Patent
Harada et al.

(10) Patent No.: US 12,713,412 B2
(45) Date of Patent: Aug. 18, 2026

(54) TERMINAL, BASE STATION, RADIO COMMUNICATION SYSTEM AND RADIO COMMUNICATION METHOD

(71) Applicant: NTT DOCOMO, INC., Tokyo (JP)

(72) Inventors: Hiroki Harada, Tokyo (JP); Shinya Kumagai, Tokyo (JP); Naoya Shibaike, Tokyo (JP); Satoshi Nagata, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 416 days.

(21) Appl. No.: 18/280,089

(22) PCT Filed: Mar. 4, 2021

(86) PCT No.: PCT/JP2021/008572
§ 371 (c)(1),
(2) Date: Sep. 1, 2023

(87) PCT Pub. No.: WO2022/185499
PCT Pub. Date: Sep. 9, 2022

(65) Prior Publication Data

US 2024/0155578 A1 May 9, 2024

(51) Int. Cl.
*H04W 72/0453* (2023.01)
*H04W 28/20* (2009.01)

(52) U.S. Cl.
CPC ....... *H04W 72/0453* (2013.01); *H04W 28/20* (2013.01)

(58) Field of Classification Search
CPC ......................... H04W 72/0453; H04W 28/20; H04L 5/0044; H04L 5/001; H04L 5/0092
See application file for complete search history.

(56) References Cited

U.S. PATENT DOCUMENTS

2017/0215186 A1* 7/2017 Chen ..................... H04L 5/0048
2019/0260530 A1* 8/2019 Yi ..................... H04W 72/0453
2019/0274162 A1* 9/2019 Zhang ................... H04W 74/08
2019/0297612 A1 9/2019 Zhou et al.
2020/0059961 A1 2/2020 Do et al.
2020/0236710 A1* 7/2020 Sun ....................... H04L 5/0016
2022/0303072 A1* 9/2022 Ciochina ............... H04L 5/0053

(Continued)

FOREIGN PATENT DOCUMENTS

JP 2020503733 A 1/2020

OTHER PUBLICATIONS

International Search Report issued in PCT/JP2021/008572 on Oct. 19, 2021 (1 page).

(Continued)

*Primary Examiner* — Yu-Wen Chang
(74) *Attorney, Agent, or Firm* — Osha Bergman Watanabe & Burton LLP

(57) ABSTRACT

A terminal comprises: a control unit that performs, when a base station configures a broader carrier bandwidth wider than a maximum carrier bandwidth supported by the terminal, a communication capable of using a second number of frequency resource larger than a first number of frequency resource, the first number of frequency resource is available by the base station on an assumption that the terminal uses the broader carrier bandwidth.

7 Claims, 9 Drawing Sheets

(56) References Cited

U.S. PATENT DOCUMENTS

2023/0254836 A1* 8/2023 Jia .......................... H04L 5/0044 370/329

OTHER PUBLICATIONS

Written Opinion of the International Searching Authority issued in PCT/JP2021/008572 on Oct. 19, 2021 (3 pages).
3GPP TS 38.101-1 V17.0.0; "3rd Generation Partnership Project; Technical Specification Group Radio Access Network; NR; User Equipment (UE) radio transmission and reception; Part 1: Range 1 Standalone (Release 17)"; Dec. 2020 (488 pages).
Samsung: "RAN2 Aspect on Carrier Aggregation"; 3GPP TSG-RAN WG2 Meeting #98, R2-1705603; Hangzhou, China, May 15-19, 2017 (3 pages).
Extended European Search Report issued in Application No. 21929071.5, mailed Nov. 18, 2024 (11 pages).
Office Action issued in Japanese Application No. 2023-503300, mailed Nov. 29, 2024 (8 pages).

* cited by examiner

FIG.3 t

Figure 3:
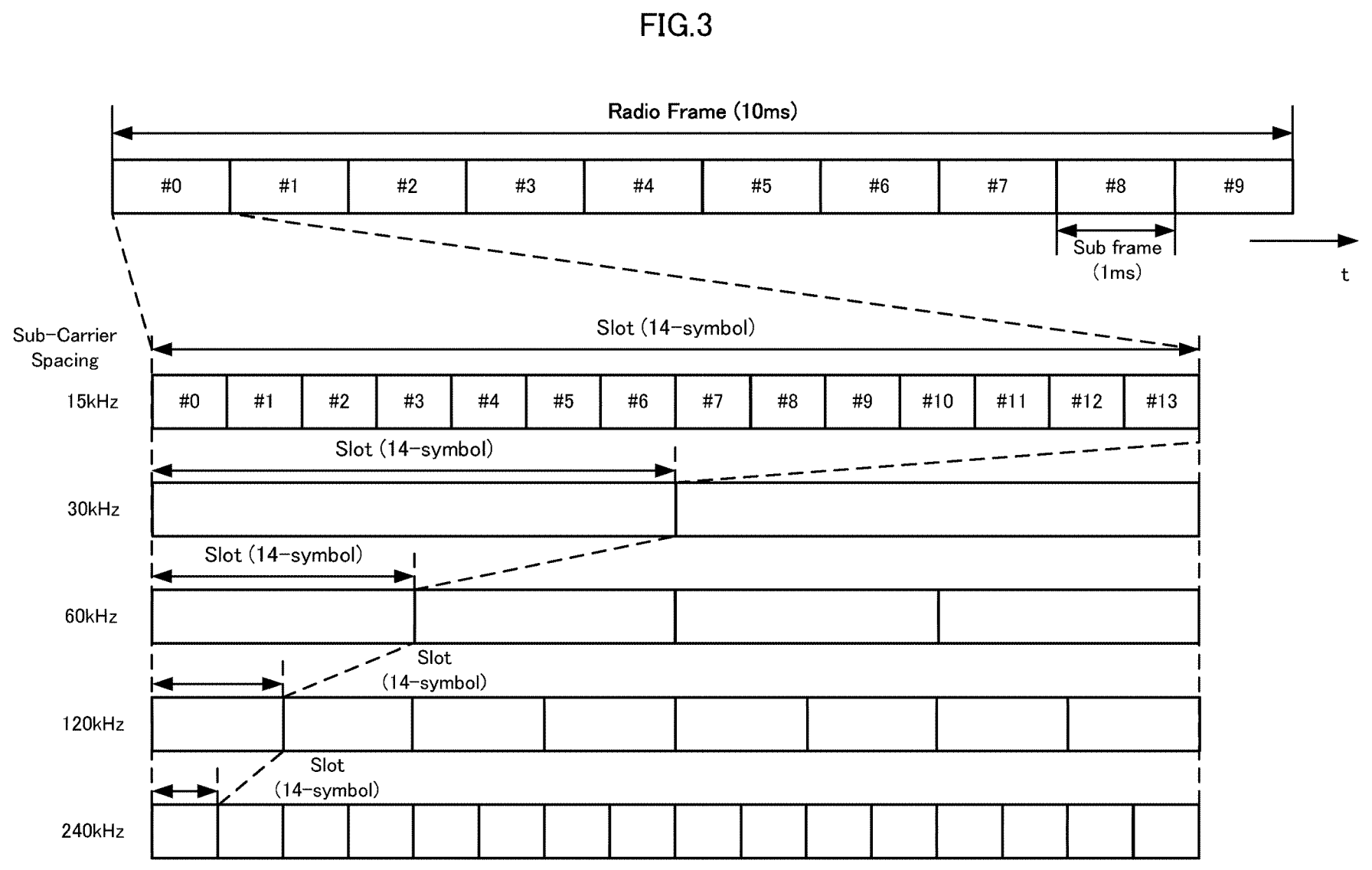

Radio Frame (10ms)

#0 #1 #2 #3 #4 #5 #6 #7 #8 #9

Sub frame (1ms)

Slot (14-symbol)

#0 #1 #2 #3 #4 #5 #6 #7 #8 #9 #10 #11 #12 #13

Slot (14-symbol)

Slot (14-symbol)

Slot (14-symbol)

Slot (14-symbol)

Sub-Carrier Spacing

15kHz

30kHz

60kHz

120kHz

240kHz

TERMINAL, BASE STATION, RADIO COMMUNICATION SYSTEM AND RADIO COMMUNICATION METHOD

TECHNICAL FIELD

The present disclosure relates to a terminal, base station, radio communication system and radio communication method for performing radio communication, in particular, a terminal, base station, radio communication system and radio communication method for performing communication in a CBW (Channel Bandwidth) set by the base station for the terminal.

BACKGROUND ART

The 3rd Generation Partnership Project (3GPP) has specified the 5th generation mobile communication system (Also called 5G, New Radio (NR), or Next Generation (NG)) and is also promoting specification of the next generation called Beyond 5G, 5G Evolution or 6G.

In the above-mentioned 5G, SCS(Subcarrier Spacing) of 15 kHz, 30 kHz and 60 kHz is assumed to be used in FR (Frequency Range)1, and SCS of 60 kHz and 120 kHz is assumed to be used in FR2 (For example, Non-Patent Literature 1).

CITATION LIST

Non-Patent Literature

[Non-Patent Literature 1]

3GPP T538.101-1 V 17.0.0 3rd Generation Partnership Project; Technical Specification Group Radio Access Network; NR; User equipment (UE) radio transmission and reception; Unit 1: Range 1 Standalone (Release 17), 3GPP, December 2020

SUMMARY OF INVENTION

Against this background, the inventors and others have focused on the fact that only one BWP (Bandwidth Part) can be activated within the CC bandwidth set by the base station if the CC(Component Carrier) bandwidth set by the base station for the terminal is wider than the maximum CC bandwidth supported by the terminal. Furthermore, the inventors and others have found the possibility of improving the frequency utilization efficiency by focusing on this new point.

Therefore, the present invention has been made in view of this situation, and it is an object of the present invention to provide a terminal, a base station, a radio communication system and a radio communication method capable of improving the frequency utilization efficiency.

An aspect of the present disclosure is a terminal comprising: a control unit that performs, when a base station configures a broader carrier bandwidth wider than a maximum carrier bandwidth supported by the terminal, a communication capable of using a second number of frequency resource larger than a first number of frequency resource, the first number of frequency resource is available by the base station on an assumption that the terminal uses the broader carrier bandwidth.

An aspect of the present disclosure is a base station comprising: a control unit that performs, when the base station configures a broader carrier bandwidth wider than a maximum carrier bandwidth supported by a terminal, a communication capable of using a second number of frequency resource larger than a first number of frequency resource, the first number of frequency resource is available by the base station on an assumption that the terminal uses the broader carrier bandwidth.

An aspect of the present disclosure is a radio communication system comprising: a terminal; and a base station; wherein the terminal and the base station comprise a control unit that performs, when the base station configures a broader carrier bandwidth wider than a maximum carrier bandwidth supported by the terminal, a communication capable of using a second number of frequency resource larger than a first number of frequency resource, the first number of frequency resource is available by the base station on an assumption that the terminal uses the broader carrier bandwidth.

An aspect of the present disclosure is a radio communication method comprising: performing, when a base station configures a broader carrier bandwidth wider than a maximum carrier bandwidth supported by a terminal, a communication capable of using a second number of frequency resource larger than a first number of frequency resource, the first number of frequency resource is available by the base station on an assumption that the terminal uses the broader carrier bandwidth.

BRIEF DESCRIPTION OF DRAWINGS

FIG. 3 is a diagram showing a configuration example of a radio frame, a sub-frame and a slot used in the radio communication system 10.

MODES FOR CARRYING OUT THE INVENTION

Figure 1:
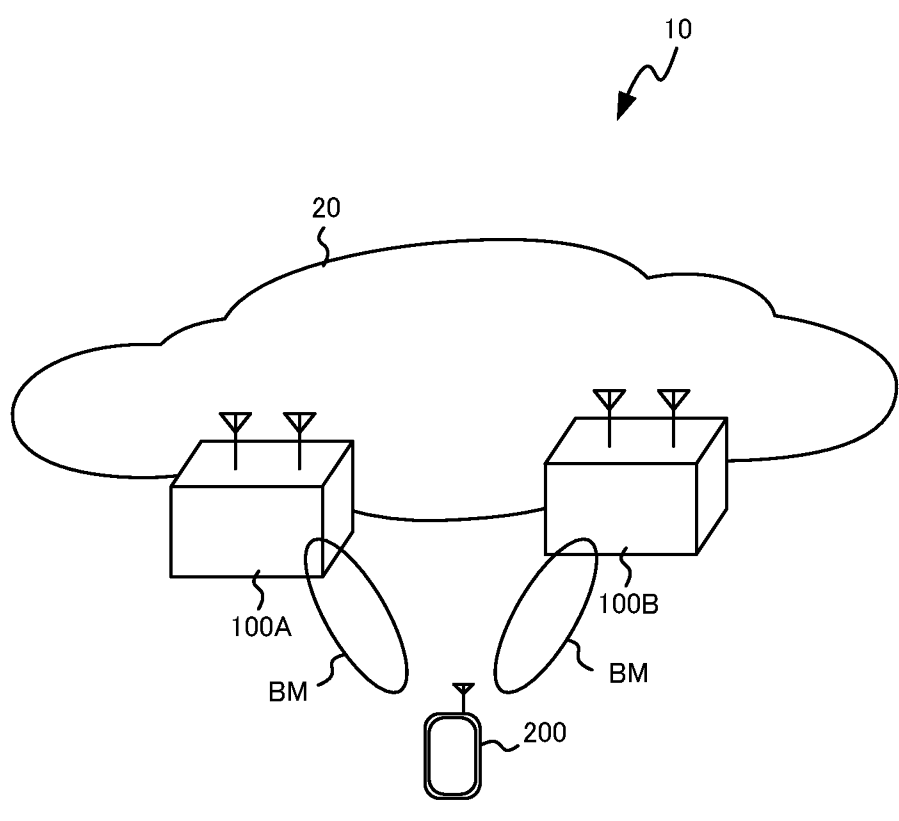
FIG. 1 is a general schematic diagram of the radio communication system 10.

Exemplary embodiments of the present invention are explained below with reference to the accompanying drawings. The same functions and structures are denoted by the same or similar reference numerals, and their descriptions are omitted accordingly.

Embodiments (1) Overall Schematic Configuration of the Radio Communication System FIG. 1 is an overall schematic configuration diagram of a radio communication system 10 according to an embodiment. The radio communication system 10 is a radio communication system according to 5G New Radio (NR) and includes a Next Generation-Radio Access Network 20 (hereinafter referred to as NG-RAN20 and a terminal 200 (UE200).

The radio communication system 10 may be a radio communication system according to a system called Beyond 5G, 5G Evolution or 6G.

The NG-RAN20 includes a radio base station 100 A (gNB100 A) and a radio base station 100B (gNB100B). The specific configuration of the radio communication system 10 including the number of gNBs and UEs is not limited to the example shown in FIG. 1.

The NG-RAN20 actually includes a plurality of NG-RAN Nodes, specifically gNBs (or ng-eNBs), connected to a core network (5GC, not shown) according to 5G. Note that the NG-RAN20 and 5 GCs may be simply described as "networks".

The gNB100 A and gNB100B are radio base stations according to 5G, and perform radio communications according to the UE200 and 5G. The gNB100 A, gNB100B, and UE200 can support Massive MIMO (Multiple-Input Multiple-Output), which generates a more directional beam BM by controlling radio signals transmitted from multiple antenna elements; Carrier Aggregation (CA), which uses multiple component carriers (CCs) bundled together; and Dual Connectivity (DC), which communicates with two or more transport blocks simultaneously between the UE and each of two NG-RAN Nodes.

Figure 2:
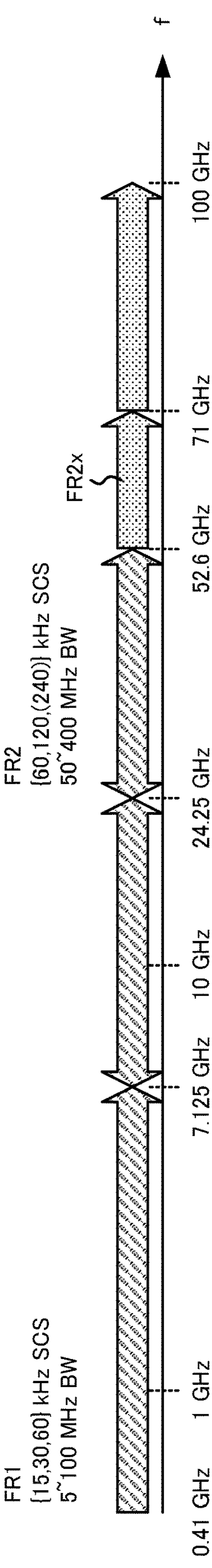
FIG. 2 is a diagram showing the frequency range used in the radio communication system 10.

The radio communication system 10 also supports multiple frequency ranges (FRs). FIG. 2 shows the frequency ranges used in the radio communication system 10.

As shown in FIG. 2, the radio communication system 10 corresponds to FR1 and FR2. The frequency bands of each FR are as follows.

FR1:410 MHz~7.125 GHz FR2:24.25 GHz~52.6 GHz FR1 uses 15, 30 or 60 kHz sub-carrier spacing (SCS) and may use a 5~100 MHz bandwidth (BW). FR2 is higher frequency than FR1 and may use 60 or 120 kHz (may include 240 kHz) SCS and may use a 50-400 MHz bandwidth (BW).

SCS may be interpreted as numerology. Numerology is defined in 3GPP TS38.300 and corresponds to one subcarrier interval in the frequency domain.

In addition, the radio communication system 10 corresponds to a higher frequency band than the FR2 frequency band. Specifically, the radio communication system 10 corresponds to a frequency band above 52.6 GHz and up to 71 GHz or 114.25 GHz. Such a high frequency band may be referred to as "FR 2x" for convenience.

In order to solve the problem that the influence of phase noise increases in the high frequency band, the Cyclic Prefix-Orthogonal Frequency Division Multiplexing (CP-OFDM)/Discrete Fourier Transform-Spread (DFT-S-OFDM) with larger Sub-Carrier Spacing (SCS) may be applied when a band exceeding 52.6 GHz is used.

FIG. 3 shows a configuration example of a radio frame, a sub-frame and a slot used in the radio communication system 10.

As shown in FIG. 3, a slot consists of 14 symbols, and the larger (wider) the SCS, the shorter the symbol period (and slot period). The SCS is not limited to the interval (frequency) shown in FIG. 3. For example, 480 kHz, 960 kHz, and the like may be used.

The number of symbols constituting 1 slot may not necessarily be 14 symbols (For example, 28, 56 symbols). Furthermore, the number of slots per subframe may vary depending on the SCS.

Note that the time direction (t) shown in FIG. 3 may be referred to as a time domain, symbol period, symbol time, etc. The frequency direction may be referred to as a frequency domain, resource block, subcarrier, bandwidth part (BWP), etc.

A DMRS is a type of reference signal and is prepared for various channels. In this context, unless otherwise specified, a DMRS for a downstream data channel, specifically a PDSCH (Physical Downlink Shared Channel), may be used. However, a DMRS for an upstream data channel, specifically a PUSCH (Physical Uplink Shared Channel), may be interpreted in the same way as a DMRS for a PDSCH.

The DMRS may be used for channel estimation in a device, e.g., UE200, as part of a coherent demodulation. The DMRS may be present only in the resource block (RB) used for PDSCH transmission.

The DMRS may have more than one mapping type. Specifically, the DMRS may have a mapping type A and a mapping type B. In a mapping type A, the first DMRS is located in the second or third symbol of the slot. In a mapping type A, the DMRS may be mapped relative to the slot boundary regardless of where the actual data transmission is initiated in the slot. The reason why the first DMRS is placed in the second or third symbol of the slot may be interpreted as placing the first DMRS after the control resource sets (CORESET).

In mapping type B, the first DMRS may be placed in the first symbol of the data allocation. That is, the location of the DMRS may be given relative to where the data is located, rather than relative to the slot boundary.

The DMRS may also have more than one type. Specifically, the DMRS may have Type 1 and Type 2. Type 1 and Type 2 differ in the maximum number of mapping and orthogonal reference signals in the frequency domain. Type 1 can output up to four orthogonal signals in single-symbol DMRS, and Type 2 can output up to eight orthogonal signals in double-symbol DMRS.

(2) Functional Block Configuration of Radio Communication System

Next, a functional block configuration of the radio communication system 10 will be described.

First, a functional block configuration of the UE200 will be described.

Figure 4:
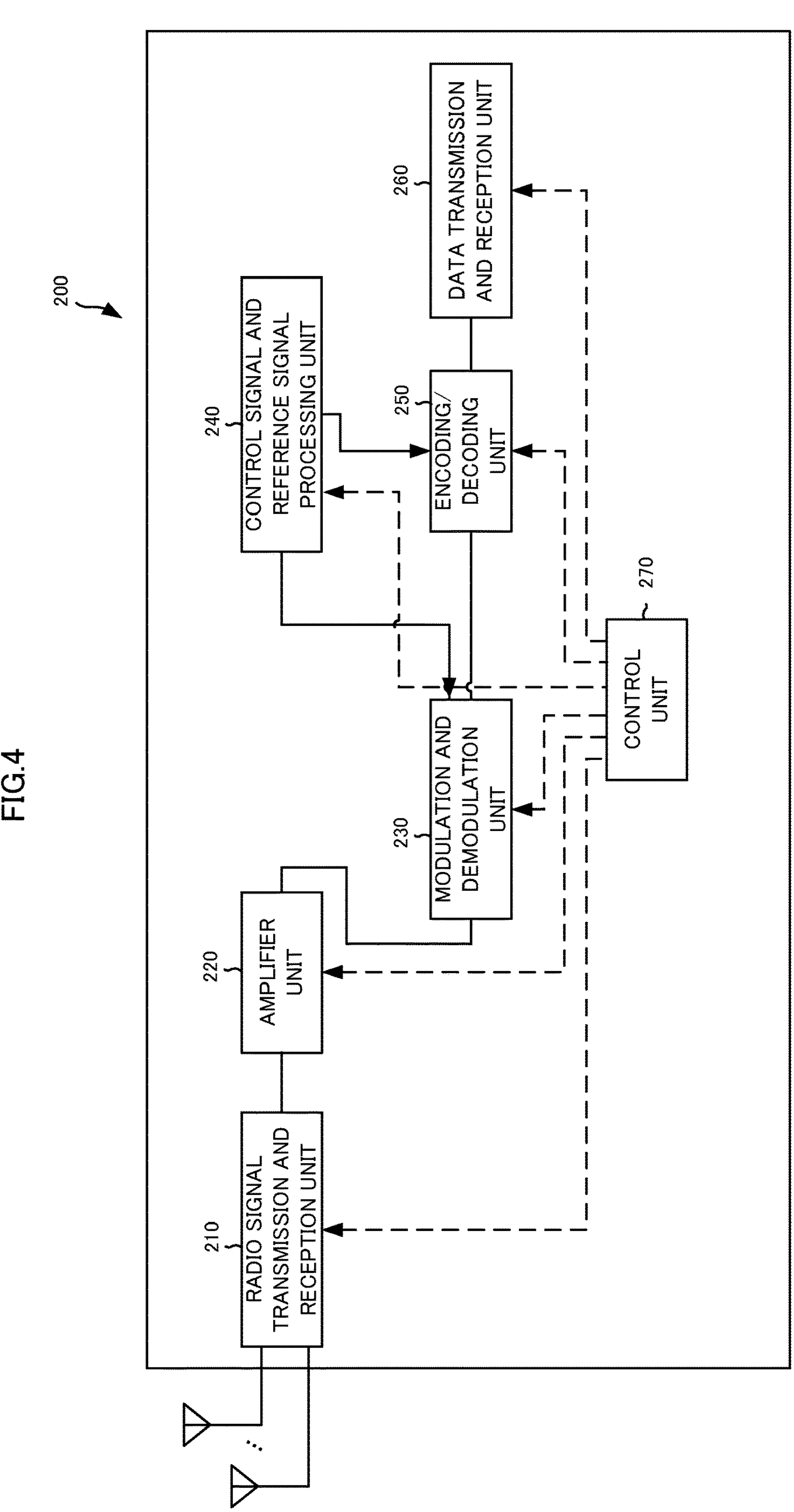
FIG. 4 is a functional block configuration diagram of the UE200.

FIG. 4 is a functional block configuration diagram of the UE200. As shown in FIG. 4, the UE200 includes a radio signal transmission and reception unit 210, an amplifier unit 220, a modulation and demodulation unit 230, a control signal and reference signal processing unit 240, an encoding/decoding unit 250, a data transmission and reception unit 260, and a control unit 270.

The radio signal transmission and reception unit 210 transmits and receives radio signals in accordance with the NR. The radio signal transmission and reception unit 210 corresponds to a Massive MIMO, a CA using a plurality of CCs bundled together, and a DC that simultaneously communicates between a UE and each of two NG-RAN Nodes.

The amplifier unit 220 is composed of a PA (Power Amplifier)/LNA (Low Noise Amplifier) or the like. The amplifier unit 220 amplifies the signal output from the modulation and demodulation unit 230 to a predetermined power level. The amplifier unit 220 also amplifies the RF signal output from the radio signal transmission and reception unit 210.

The modulation and demodulation unit 230 performs data modulation/demodulation, transmission power setting, resource block allocation, etc. for each predetermined communication destination (gNB100 or other gNB). In the modulation and demodulation unit 230, Cyclic Prefix-Orthogonal Frequency Division Multiplexing (CP-OFDM)/

Discrete Fourier Transform-Spread (DFT-S-OFDM) may be applied. DFT-S-OFDM may be used not only for the uplink (UL) but also for the downlink (DL).

The control signal and reference signal processing unit 240 performs processing related to various control signals transmitted and received by the UE200 and various reference signals transmitted and received by the UE200.

Specifically, the control signal and reference signal processing unit 240 receives various control signals transmitted from the gNB100 via a predetermined control channel, for example, a radio resource control layer (RRC) control signal. The control signal and reference signal processing unit 240 also transmits various control signals to the gNB100 via a predetermined control channel.

The control signal and reference signal processing unit 240 executes processing using a reference signal (RS) such as a demodulation reference signal (DMRS) and a phase tracking reference signal (PTRS).

The DMRS is a known reference signal (pilot signal) between a base station and a terminal of each terminal for estimating a fading channel used for data demodulation. The PTRS is a reference signal of each terminal for estimating phase noise, which is a problem in a high frequency band.

In addition to the DMRS and the PTRS, the reference signal may include a Channel State Information-Reference Signal (CSI-RS), a Sounding Reference Signal (SRS), and a Positioning Reference Signal (PRS) for position information.

The channel may include a control channel and a data channel. The control channel may include PDCCH (Physical Downlink Control Channel), PUCCH (Physical Uplink Control Channel), RACH(Random Access Channel), Downlink Control Information (DCI) including Random Access Radio Network Temporary Identifier (RA-RNTI), and Physical Broadcast Channel (PBCH).

Data channels include PDSCH (Physical Downlink Shared Channel) and PUSCH (Physical Uplink Shared Channel). Data means data transmitted over a data channel. A data channel may be read as a shared channel.

Here, the control signal and reference signal processing unit 240 may receive downlink control information (DCI). The DCI includes existing fields for storing DCI Formats, Carrier indicator (CI), BWP indicator, Frequency Domain Resource Allocation (FDRA), Time Domain Resource Allocation (TDRA), Modulation and Coding Scheme (MCS), HPN (HARQ Process Number), New Data Indicator (NDI), Redundancy Version (RV), and the like.

The value stored in the DCI Format field is an information element that specifies the format of the DCI. The value stored in the CI field is an information element that specifies the CC to which the DCI applies. The value stored in the BWP indicator field is an information element that specifies the BWP to which the DCI applies. The BWP that can be specified by the BWP indicator is set by an information element (Bandwidth Part-Config) contained in the RRC message. The value stored in the FDRA field is an information element that specifies the frequency domain resource to which the DCI applies. The frequency domain resource is specified by the value stored in the FDRA field and the information element (RA Type) contained in the RRC message. The value stored in the TDRA field is the information element that specifies the time domain resource to which the DCI is applied. The time domain resource is specified by the value stored in the TDRA field and the information element (pdsch-TimeDomainAllocationList, pusch-TimeDomainAllocationList) contained in the RRC message. The time domain resource may be specified by the value stored in the TDRA field and the default table. The value stored in the MCS field is an information element that specifies the MCS to which the DCI applies. The MCS is specified by the value stored in the MCS and the MCS table. The MCS table may be specified by an RRC message or specified by RNTI scrambling. The value stored in the HPN field is an information element that specifies the HARQ Process to which the DCI is applied. The value stored in the NDI is an information element for identifying whether the data to which the DCI is applied is first-time data. The value stored in the RV field is an information element for specifying the redundancy of the data to which the DCI is applied.

The encoding/decoding unit 250 performs data partitioning/concatenation and channel coding/decoding for each predetermined communication destination (gNB100 or other gNB).

Specifically, the encoding/decoding unit 250 divides the data output from the data transmission and reception unit 260 into predetermined sizes and performs channel coding for the divided data. The encoding/decoding unit 250 decodes the data output from the modulation and demodulation unit 230 and concatenates the decoded data.

The data transmission and reception unit 260 transmits and receives the protocol data unit (PDU) and the service data unit (SDU). Specifically, the data transmission and reception unit 260 performs assembly/disassembly of the PDU/SDU in a plurality of layers (Media access control layer (MAC), radio link control layer (RLC), packet data convergence protocol layer (PDCP), etc.). The data transmission and reception unit 260 executes error correction and retransmission control of data based on HARQ (Hybrid Automatic Repeat Request).

The control unit 270 controls each function block constituting the UE200. In the embodiment, the control unit 270 constitutes a control unit that performs, when the gNB100 configures a broader carrier bandwidth wider than a maximum carrier bandwidth supported by the UE200, a communication capable of using a second number of frequency resource larger than a first number of frequency resource, the first number of frequency resource is available by the base station on an assumption that the terminal uses the broader carrier bandwidth.

Here, the maximum carrier bandwidth supported by the UE200 is the maximum CC bandwidth supported by the UE200. The broader carrier bandwidth is the broader CC bandwidth set by the gNB100 to the UE200. The maximum CC bandwidth may be referred to as the maximum channel bandwidth (CBW), and the broader CC bandwidth may be referred to as the broader CBW.

When the broader carrier bandwidth is set to be wider than the maximum carrier bandwidth supported by the UE200, the control unit 270 may perform communication using two or more specific bandwidth, which is set as the maximum carrier bandwidth in the broader carrier bandwidth. The subcarrier spacing (SCS) applied to each of the two or more specific bandwidths is the same. The number of the two or more specific bandwidths may be less than or equal to the maximum number of CCs supported by UE200 in the CA.

However, since the two or more specific bandwidths are bandwidths set within one CC bandwidth set by gNB100, the subcarrier intervals (SCS) applied to each of the two or more specific bandwidths are the same. Therefore, the specific bandwidth is a different concept from the CC to which separate SCS may be applied.

Furthermore, since the two or more specific bandwidths are a bandwidth set within one CC bandwidth set by gNB100, the two or more specific bandwidths can be processed by one FFT (Fast Fourier Transform) and is set to one serving cell for the two or more specific bandwidths. Therefore, the specific bandwidths are different concept from CC, which needs to be processed by separate FFTs. The specific bandwidth is different concept from CC, where separate serving cells are configured.

Second, the functional block configuration of the gNB100 will be described.

Figure 5:
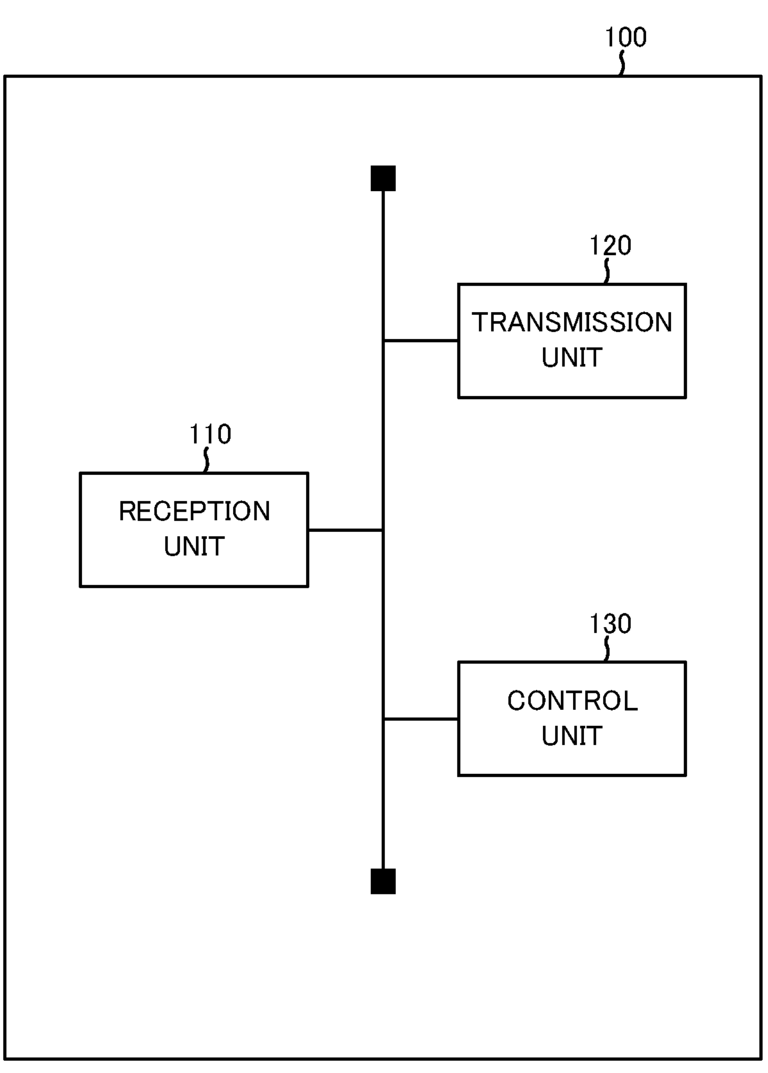
FIG. 5 is a functional block configuration diagram of the gNB100.

FIG. 5 is a functional block configuration diagram of the gNB100. As shown in FIG. 5, the gNB100 has a reception unit 110, a transmission unit 120, and a control unit 130.

The reception unit 110 receives various signals from the UE200. The reception unit 110 may receive UL signals via PUCCH or PUSCH.

The transmission unit 120 transmits various signals to the UE200. The transmission unit 120 may transmit DL signals via PDCCH or PDSCH.

The control unit 130 controls the gNB100. In an embodiment, the control unit 130 constitutes a control unit that performs, when the gNB100 configures a broader CC bandwidth wider than a maximum CC bandwidth supported by the UE200, a communication capable of using a second number of frequency resource larger than a first number of frequency resource, the first number of frequency resource is available by the base station on an assumption that the terminal uses the broader carrier bandwidth.

(3) Background

The background of the embodiment will be described below. The CBW will be described below.

Figure 6:
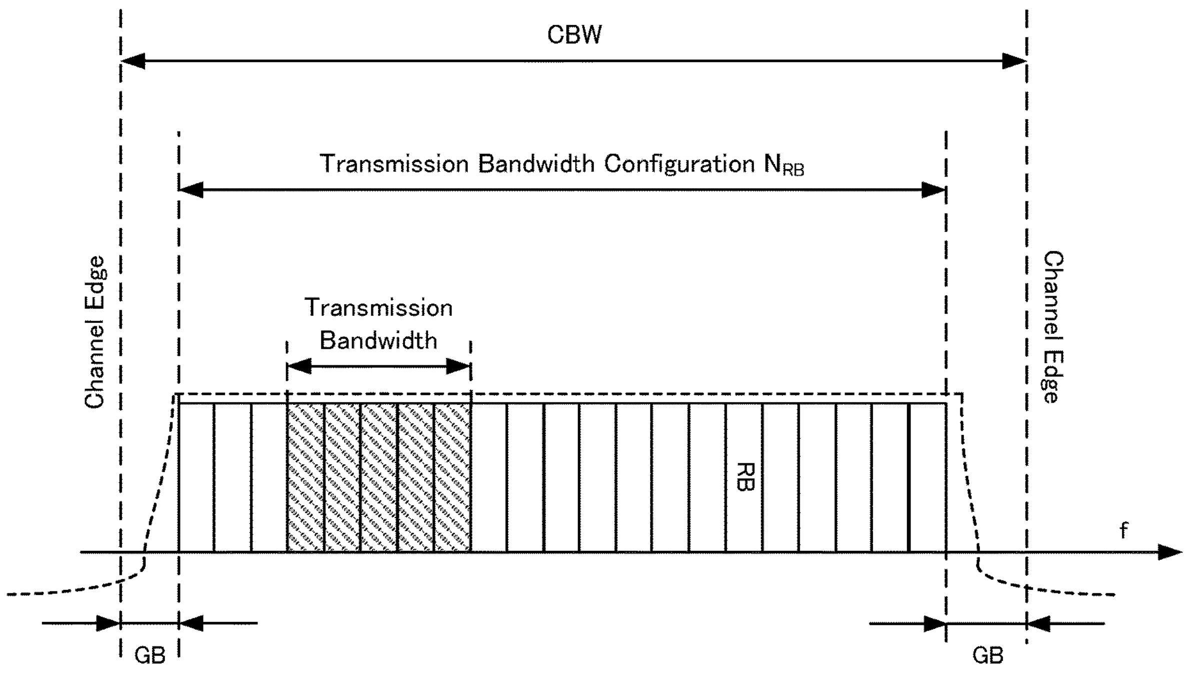
FIG. 6 is a diagram for explaining the background.

Specifically, as shown in FIG. 6, a guard band (GB) is provided at both ends of the CBW, and a band excluding the GB in the CBW is a band that can be used for transmission. Such a band is set by the number of resource blocks (RBs) (Transmission Bandwidth Configuration $N_{RB}$ in FIG. 6). The active Transmission Bandwidth (RB) used for actual transmission is set from the Transmission Bandwidth Configuration $N_{RB}$. The Transmission Bandwidth may be referred to as the Bandwidth Part (BWP).

First, the CBW limit (less than or equal to the maximum CBW) is defined for each SCS. For example, if the SCS is 15 kHz in FR1, the maximum CBW is 50 MHz. If the SCS is 30 kHz in FR1, the maximum CBW is 100 MHz. If the SCS is 60 kHz in FR1, the maximum CBW is 200 MHz. If the SCS is 60 kHz in FR2, the maximum CBW is 200 MHz. If the SCS is 120 kHz in FR2, the maximum CBW is 400 MHz. If a bandwidth larger than the maximum CBW is used, it is necessary to use a CA that bundles more than 2 CCs.

Second, even if the broader CBW wider than the maximum CBW supported by UE200 is allocated to a single operator (For example, gNB100), GBs must be provided at both ends of the CBW supported by UE200.

Third, the maximum CBW per SCS is defined such that the number of FFT points is less than or equal to the specified number of points (For example, 4096). The specified number of points depends on the device performance of UE200 and the device performance of gNB100.

Against this background, inventors and others have focused on the case where gNB100 sets a broader CC bandwidth that is wider than the maximum CC bandwidth supported by UE200, and have found that the frequency utilization efficiency can be improved in such a case.

(4) Existing Technologies

The existing technologies of the embodiments will be described below. A case in which a 120 kHz SCS is used in the FR2 will be illustrated. In such a case, when the CBW is 400 MHz, the number of frequency resources (Number of RBs) is 264. When the CBW is 100 MHz, the number of RBs is 66.

Under these assumptions, we consider the case where the gNB100 can be configured with the broader CBW (broader CC bandwidth) of 400 MHz, the maximum CBW supported by the UE200 is 100 MHz, and the CA has an upper limit of 4 CCs supported by the UE200.

Figure 7:
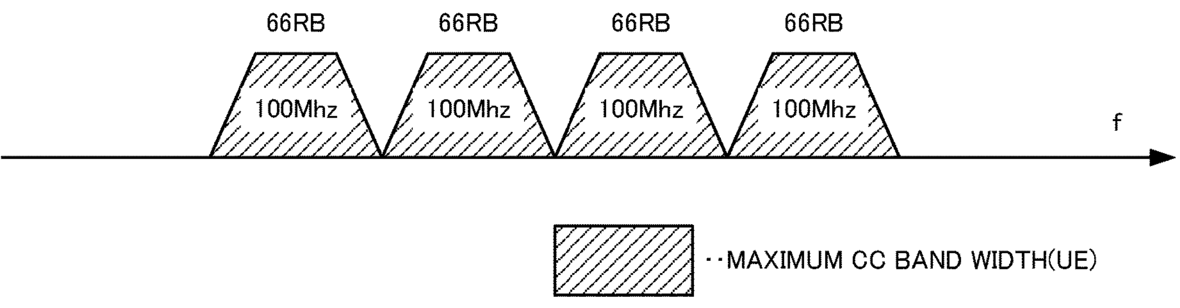
FIG. 7 is a diagram for explaining the existing technology.

For example, we consider the case where a CA that bundles 4 CCs is executed using a CBW of 100 MHz. As shown in FIG. 7, a CA that bundles 4 CCs can use a band of 400 MHz, but the number of RBs obtained by the CA is 264(=66×4), which is the same as the case where the CBW is 400 MHz.

Figure 8:
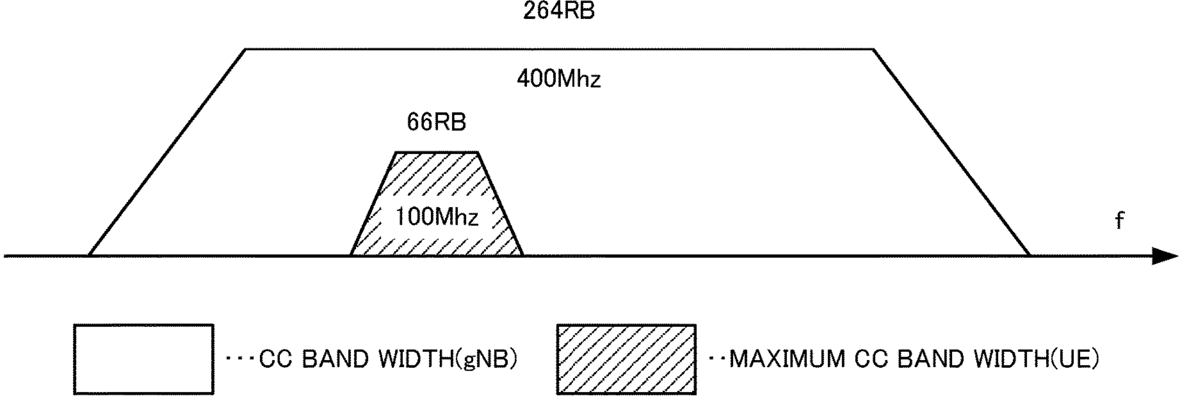
FIG. 8 is a diagram for explaining the existing technology.

Alternatively, consider the case where the broader CBW of 400 MHz is set. As shown in FIG. 8, because the maximum CBW supported by the UE200 is 100 MHz, the bandwidth available by the UE200 is up to the 100 MHz BWP in the broader CBW.

In view of such existing technology, the inventors, etc. focused on the following points as a result of careful examination.

First, they focused on the possibility of increasing frequency utilization efficiency by effectively utilizing GBs between CCs when CA is executed.

Second, they focused on the possibility that it is difficult for both UE200 and gNB100 to support the broader CBW such as 400 MHz for implementation reasons such as the number of FFT points and wideband filters, and that gNB100 can set the broader CBW, but UE200 does not support the broader CBW. Support for 400 MHz CBW in FR2 is optional for existing technologies.

Third, even if both UE200 and gNB100 support the broader CBW such as 400 MHz, we focused on the possibility that the frequency utilization efficiency will not be high because in some cases the GB width is set to be proportional to CBW in existing technologies.

Fourth, it was noted that when the gNB100 is capable of configuring the broader CBW, but the UE200 is not capable of the broader CBW, the broader CBW cannot be used for the UE200 that does not support the broader CBW (see FIG. 8).

(5) Application Scene

Based on the existing technology described above, the application scene according to the embodiment will be described below. The application scene will illustrate a case where the SCS of 120 kHz is used in the FR2 in the same manner as the existing technology described above. In such a case, the broader CBW (broader CC bandwidth) which the gNB100 can set is 400 MHz, the maximum CBW (maximum CC bandwidth) supported by the UE200 is 100 MHz, and the upper limit number of CCs supported by the UE200 in the CA is 4.

In such a case, when the gNB100 sets the broader CBW which is wider than the maximum CBW supported by the UE200, the UE200 and the gNB100 perform communication capable of using the second number of frequency resources which is larger than the first number of frequency resources available by the gNB100 under the assumption that the UE200 uses the broader CBW. Hereinafter, the first number of frequency resources is referred to as the first number of available RBs, and the second number of frequency resources is referred to as the second number of available RBs.

Here, the maximum CBW supported by the UE200 may be specified by an information element (For example, supportedBandwidthDL) reported by the UE200. The broader CBW set by the gNB100 may be set by an information element (For example, SCS-SpecificCarrier) included in the RRC parameter (For example, ServingCellConfig). The case where the gNB100 sets the broader CBW wider than the maximum CBW supported by the UE200 may be interpreted as the case where the gNB100 sets a PRB number larger than the maximum PRB number supported by the UE200.

The first number of available RB may be the number of RBs available under the assumption that the UE200 uses the broader CBW as a CBW, or the number of RBs available under the assumption that the UE200 uses a CA using a CC corresponding to the broader CBW. The first number of available RB may be the number of RBs defined by the existing technology. The second number of available RB may be the number of RBs newly introduced.

For example, in the case where a 120 kHz SCS is used in FR2, the first number of available RB of a 400 MHz CBW is 264. In the embodiment, when the gNB100 sets a CBW of 400 MHz, a mechanism is introduced to enable the use of a number of RBs greater than 264.

Figure 9:
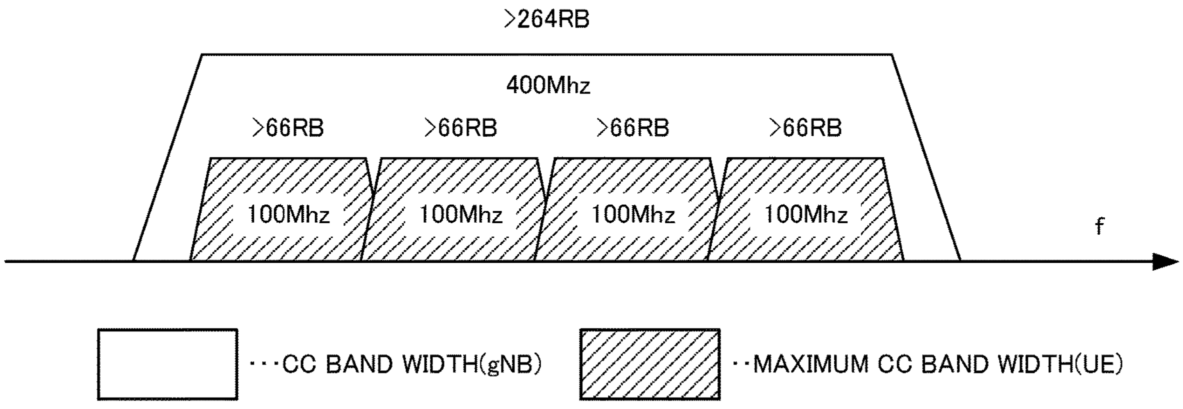
FIG. 9 is a diagram for explaining an application scene.

Specifically, as shown in FIG. 9, a number of RBs may be available in the CBW of 400 MHz (For example, the CC bandwidth of gNB100) greater than the existing value (264). Although the details will be described later, a GB narrower than the existing GB may be introduced as the CBW of 400 MHz, and a number of FFT points greater than the existing number of FFT points may be introduced.

In addition, a RB greater than the existing value (64) may be available for the CBW of 100 MHz (maximum CC bandwidth of UE 200). A GB narrower than the existing GB may be introduced as the CBW of 100 MHz, and a number of FFT points greater than the existing number of FFT points may be introduced, as described in detail below.

(5.1) Number of Available RBs

Here, the second number of available RBs may be newly introduced as a number that can be specified by the Transmission Bandwidth Configuration $N_{RB}$ described in FIG. 6. In addition, a value larger than the existing value (For example, 275) may be introduced as a value that can be set for a possible value (maxNrofPhysicalResourceBlocks) such as an information element (For example, the carrierBandwith included in the SCS-SpecificCarrier) included in the RRC parameter (For example, ServingCellConfig).

The configuration in which the second number of available RBs is introduced may be read as a configuration in which a GB narrower than the existing GB is introduced as a GB of the broader CBW. The existing GB may be a minimum guard band specified by 3GPP TS38.101 V 17.0.0 or the like. The existing GB may be read as a configuration in which a GB smaller than the sum of the GBs of the CC corresponding to the broader CBW (That is, the number of CCs GB×CC) is introduced as a GB of the broader CBW. In such a case, a new GB may be defined in association with the broader CBW as a GB applied to a case in which the gNB100 sets the broader CBW wider than the maximum CBW supported by the UE200. The new GB may be defined as a minimum guard band.

(5.2) Number of FFT Points

A New Number of FFT Points Larger than the Existing number of FFT points (4096) may be defined as the number of FFT points. The number of new FFT points may be 8192. In such a case, the CBW associated with the SCS may be wider than the upper limit of the existing CBW. For example, a CBW (For example, 100 MHz) greater than the upper limit of the existing CBW (For example, 50 MHz) may be set for the 15 kHz SCS. In addition, a value greater than the existing value (For example, 275) may be introduced as a value that can be set for a possible value (maxNrofPhysicalResourceBlocks) such as an information element (For example, the carrierBandwith included in the SCS-SpecificCarrier) included in the RRC parameter (For example, ServingCellConfig).

(5.3) Allocating a Band Wider than the Maximum CBW

Allocating a band wider than the maximum CBW supported by the UE200 may be allocated within the wide band CBW. Specifically, the UE200 and the gNB100 may perform communication using two or more specific bandwidths set at the maximum CBW in the wide band CBW when a wide band CBW wider than the maximum CBW supported by the UE200 is set.

In such a case, the condition that the SCS applied to each of the two or more specific bandwidths is the same may be required. The condition that two or more specific bandwidths do not overlap may be required.

In addition, smaller GBs than existing GBs may be introduced as GBs at both ends of the maximum CBW supported by the UE200. In such a case, new GBs may be defined as GBs at both ends of the maximum CBW supported by the UE200 in association with the maximum CBW. The new GBs may be defined as the minimum guard band.

Here, the specific bandwidth may be considered as a BWP that can be activated simultaneously in the broader CBW. Two or more BWPs that can be activated simultaneously in the broader CBW may be considered as a BWP group.

Alternatively, the specific bandwidth may be considered as a frequency-oriented RB group. The specific frequency band may be referred to as the RB set. A special BWP may be defined as a BWP for which two or more specific bandwidths can be set.

In this way, when two or more specific bandwidths are set in the broader CBW, one or more options selected from the following options may be employed.

(5.3.1) First Option

In the first option, a serving cell may allocate PDSCH resources for two or more specific bandwidths simultaneously. For example, a DCI may include an allocation information element that specifies the PDSCH resources to allocate for each of two or more specific bandwidths. Alternatively, a DCI may include an allocation information element that specifies the PDSCH resources to allocate for any one specific bandwidth of two or more specific bandwidths, and the allocation information element included in the DCI may also be applied to other specific bandwidths. Alternatively, two or more DCIs corresponding to two or more specific bandwidths may individually include an allocation information element that specifies the PDSCH resources to allocate for each of two or more specific bandwidths.

(5.3.2) Second Option

The second option may extend the FDRA field. For example, the number of bits in the FDRA field that signals the allocation of resources to two or more specific bandwidths (BWP) may be extended if the specific bandwidths are treated as BWP groups that can be activated simultaneously in the broader CBW. If the specific bandwidths are treated as frequency-oriented RB groups, the FDRA field may signal the allocation of resources to one RB group, and an information element (For example, RB group bitmap) indicating which RB group the allocation of resources applies to may be notified separately from the FDRA field.

(5.3.3) Third Option

The third option considers the Transport Block (TB), the HARQ process, and the HARQ feedback. Specifically, the following mechanisms may be employed:

First, different TBs may be mapped to each of the two or more specific bandwidths, and different HARQ processes may be configured to each of the two or more specific bandwidths.

Second, TBs may be mapped across the two or more specific bandwidths, and one HARQ process may be configured for the two or more specific bandwidths.

Third, HARQ feedback may be performed separately for each of the two or more specific bandwidths using a CBG (Code Block Group) mechanism.

(5.3.4) Fourth Option

In the fourth option, UL BWP is considered. Specifically, the following mechanisms may be adopted.

First, in the TDD band, the center of the UL BWP may be aligned with the center of any one of the specific frequency bands set in the broader CBW.

Second, the specific frequency bands that do not overlap the UL BWP may always be assumed to be available for DL communications, or only the time resources available for DL communications in the specific frequency bands that overlap the UL BWP may be assumed to be available for DL communications as well. Whether the former assumption is possible may be reported as terminal capability.

(5.3.5) Fifth Option

In the fifth option, PDCCH (CORESET) is considered. Specifically, the following mechanisms may be adopted:

First, the PDCCH (CORESET) may be assumed to be mapped to one specific frequency band (Case 1).

Second, the PDCCH (CORESET) may be assumed to be mappable to each of two or more specific frequency bands (Case 2).

Third, the PDCCH (CORESET) may be assumed to be mappable across two or more specific frequency bands (Case 3).

Fourth, new values different from the existing values may be introduced for the upper limits of the CCE (Control Channel Element) and BD (Blind Decoding) numbers. When Case 2 and Case 3 are applied, new values may be introduced for the upper limits of the CCE and BD numbers.

(5.3.6) Sixth Option

The sixth option examines CSI-RS and CSI reporting. Specifically, the following mechanisms may be employed:

First, the CSI-RS may be assumed to be mapped to one specific frequency band (Case 1).

Second, the CSI-RS may be assumed to be mappable to each of two or more specific frequency bands (Case 2).

Third, the CSI-RS may be assumed to be mappable across two or more specific frequency bands (Case 3).

Fourth, the unit of CSI reporting may be different for each of the aforementioned cases. For example, in cases 1 and 2, individual CSI reporting may be performed for each specific frequency band, and in case 3, CSI reporting may be performed for two or more specific frequency bands.

Fourth, the use of the CSI-RS may be different for each of the aforementioned cases. Applications of the CSI-RS include CSI-Acquisition, Beam management, UE200 Tracking, UE200 Mobility, etc.

(5.4) Conditions

Conditions may be specified for setting two or more specified frequency bands within the broader CBW. Conditions may include conditions for setting two or more specified frequency bands, bands, duplex mode, serving cell type, and the like. Conditions may be predetermined in the radio communication system 10.

(5.5) UE Capability

A UE Capability may be defined that implicitly or explicitly indicates whether the UE200 corresponds to two or more specific frequency bands set within the broader CBW. For example, a terminal type such as an IoT terminal (reduced capability), IAB (IAB-MT)-MT (Mobile Termination), or FWA (Fixed Wireless Access) terminal may implicitly indicate whether the UE200 corresponds to two or more specific frequency bands set within the broader CBW. Other information elements included in the UE Capability may implicitly indicate whether the UE200 corresponds to two or more specific frequency bands set within the broader CBW.

In addition, assuming that the UE200 corresponds to a CA, two or more specific frequency bands may be set within the broader CBW. The upper limit of the number of specific frequency bands set within the broader CBW may be based on the upper limit of the number of CCs that can be CA. For example, the upper limit of the number of specific frequency bands may be the same as the upper limit of the number of CCs that can be CA.

(6) Actions and Effects

In embodiments, the UE200 and the gNB100 perform communications that can use a second number of frequency resources that is greater than the first number of frequency resources available by the gNB100 under the assumption that the terminal uses the broadband CC bandwidth when the gNB100 sets a broadband CC bandwidth (CBW) that is greater than the maximum CC bandwidth (maximum CBW) supported by the UE200. According to such a configuration, in the case where the gNB100 sets a CBW wider than the maximum CBW supported by the UE200, a second number of frequency resource number larger than the first number of frequency resource number (the existing RB number) is available, so that the frequency utilization efficiency can be improved.

(7) Other Embodiments

Although the contents of the present invention have been described in accordance with the above embodiments, it is obvious to those skilled in the art that the present invention is not limited to these descriptions but can be modified and improved in various ways.

The block diagram (FIGS. 4 and 5) used in the description of the above embodiments shows a block of functional units. Those functional blocks (structural components) can be realized by a desired combination of at least one of hardware and software. Means for realizing each functional block is not particularly limited. That is, each functional block may be implemented using a single device that is physically or logically coupled, or two or more devices that are physically or logically separated may be directly or indirectly (For example, using wire, wireless, etc.) connected and implemented using these multiple devices. The functional block may be implemented using the single device or the multiple devices combined with software.

Functions include judging, deciding, determining, calculating, computing, processing, deriving, investigating, searching, confirming, receiving, transmitting, outputting, accessing, resolving, selecting, choosing, establishing, comparing, assuming, expecting, considering, broadcasting, notifying, communicating, forwarding, configuring, reconfiguring, allocating (mapping), assigning, and the like. However, the functions are not limited thereto. For example, a functional block (component) that functions transmission is called a transmission unit (transmitting unit) or a transmitter. As described above, the method of realization of both is not particularly limited.

Figure 10:
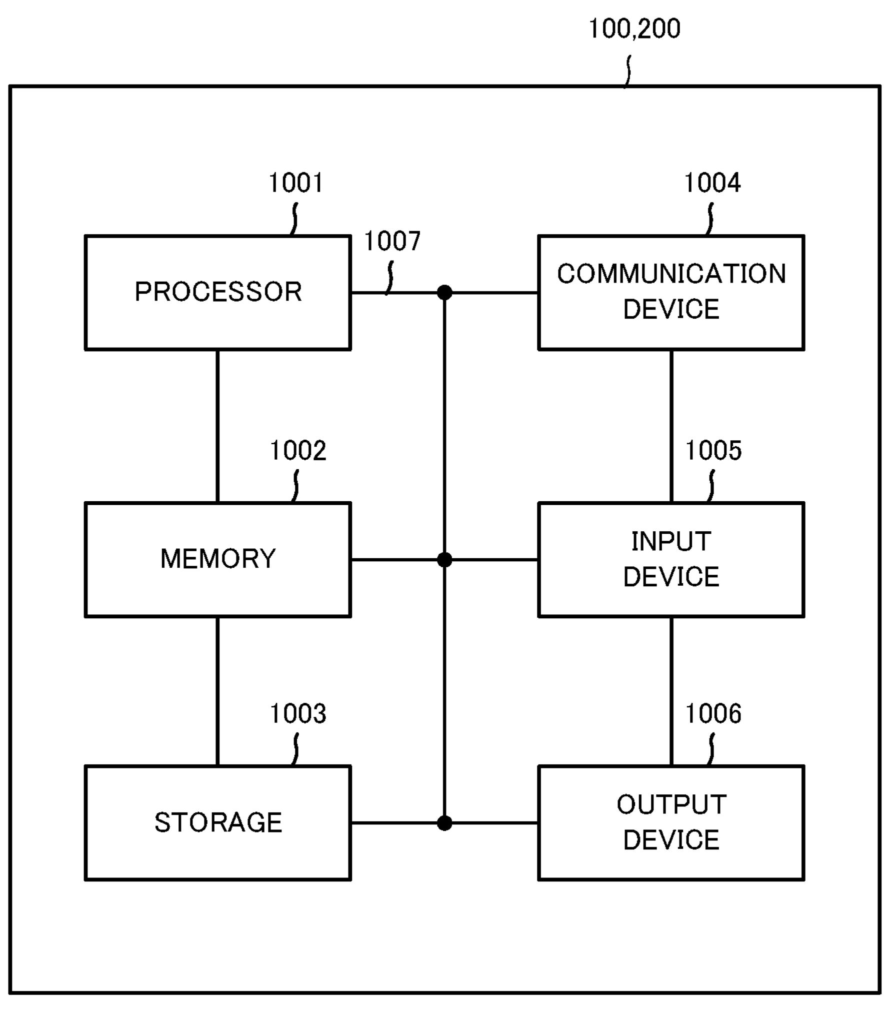
FIG. 10 is a diagram 10 showing an example of a hardware configuration of the gNB100 and the UE200.

In addition, the above-mentioned gNB100 and UE200 (the device) may function as a computer for processing the radio communication method of the present disclosure. FIG. 10 is a diagram showing an example of a hardware configuration of the device. As shown in FIG. 10, the device may be configured as a computer device including a processor 1001, a memory 1002, a storage 1003, a communication device 1004, an input device 1005, an output device 1006 and a bus 1007.

Furthermore, in the following explanation, the term "device" can be replaced with a circuit, device, unit, and the like. The hardware configuration of the device may be configured to include one or more of the devices shown in the figure, or may be configured to include no part of the devices.

Each functional block of the device (see FIG. 4) is implemented by any hardware element of the computer device, or a combination of the hardware elements.

Moreover, the processor 1001 performs computing by loading a predetermined software (computer program) on hardware such as the processor 1001 and the memory 1002, and realizes various functions of the reference device by controlling communication via the communication device 1004, and controlling reading and/or writing of data on the memory 1002 and the storage 1003.

Processor 1001, for example, operates an operating system to control the entire computer. Processor 1001 may be configured with a central processing unit (CPU), including interfaces to peripheral devices, controls, computing devices, registers, etc.

Moreover, the processor 1001 reads a computer program (program code), a software module, data, and the like from the storage 1003 and/or the communication device 1004 into the memory 1002, and executes various processes according to the data. As the computer program, a computer program that is capable of executing on the computer at least a part of the operation explained in the above embodiments is used. Furthermore, the various processes described above may be performed by one processor 1001 or may be performed simultaneously or sequentially by two or more processors 1001. The processor 1001 can be implemented by using one or more chips. Alternatively, the computer program can be transmitted from a network via a telecommunication line.

The memory 1002 is a computer readable recording medium and is configured, for example, with at least one of Read Only Memory (ROM), Erasable Programmable ROM (EPROM), Electrically Erasable Programmable ROM (EEPROM), Random Access Memory (RAM), and the like. The memory 1002 may be referred to as a register, cache, main memory (main storage device), etc. The memory 1002 may store programs (program codes), software modules, etc., which can execute the method according to one embodiment of the present disclosure.

The storage 1003 is a computer readable recording medium. Examples of the storage 1003 include an optical disk such as Compact Disc ROM (CD-ROM), a hard disk drive, a flexible disk, a magneto-optical disk (for example, a compact disk, a digital versatile disk, Blu-ray (Registered Trademark) disk), a smart card, a flash memory (for example, a card, a stick, a key drive), a floppy (Registered Trademark) disk, a magnetic strip, and the like. The storage 1003 can be called an auxiliary storage device. The recording medium can be, for example, a database including the memory 1002 and/or the storage 1003, a server, or other appropriate medium.

The communication device 1004 is hardware (transmission/reception device) capable of performing communication between computers via a wired and/or wireless network. The communication device 1004 is also called, for example, a network device, a network controller, a network card, a communication module, and the like.

The communication device 1004 includes a high-frequency switch, a duplexer, a filter, a frequency synthesizer, and the like in order to realize, for example, at least one of Frequency Division Duplex (FDD) and Time Division Duplex (TDD).

The input device 1005 is an input device (for example, a keyboard, a mouse, a microphone, a switch, a button, a sensor, and the like) that accepts input from the outside. The output device 1006 is an output device (for example, a display, a speaker, an LED lamp, and the like) that outputs data to the outside. Note that, the input device 1005 and the output device 1006 may be integrated (for example, a touch screen).

Each device, such as the processor 1001 and the memory 1002, is connected by a bus 1007 for communicating information. The bus 1007 may be configured using a single bus or a different bus for each device.

In addition, the device may be configured to include hardware such as a microprocessor, a digital signal processor (DSP), an application specific integrated circuit (ASIC), a programmable logic device (PLD), a field programmable gate array (FPGA), etc., which may provide some or all of each functional block. For example, the processor 1001 may be implemented by using at least one of these hardware.

Information notification is not limited to the aspects/embodiments described in the present disclosure and may be performed using other methods. For example, information notification may be performed by physical layer signaling (e.g., Downlink Control Information (DCI), Uplink Control Information (UCI), higher layer signaling (e.g., RRC signaling, Medium Access Control (MAC) signaling, Notification Information (Master Information Block (MIB), System Information Block (SIB)), other signals, or combinations thereof. RRC signaling may also be referred to as RRC messages, e.g., RRC Connection Setup messages, RRC Connection Reconfiguration messages, etc.

Each of the above aspects/embodiments can be applied to at least one of Long Term Evolution (LTE), LTE-Advanced (LTE-A), SUPER 3G, IMT-Advanced, 4th generation mobile communication system (4G), 5th generation mobile communication system (5G), Future Radio Access (FRA), New Radio (NR), W-CDMA (Registered Trademark), GSM (Registered Trademark), CDMA2000, Ultra Mobile Broadband (UMB), IEEE 802.11 (Wi-Fi (Registered Trademark)), IEEE 802.16 (WiMAX (Registered Trademark)), IEEE 802.20, Ultra-WideBand (UWB), Bluetooth (Registered Trademark), a system using any other appropriate system, and a next-generation system that is expanded based on these. Further, a plurality of systems may be combined (for example, a combination of at least one of the LTE and the LTE-A with the 5G).

The processing procedures, sequences, flowcharts, etc. of the embodiments/embodiments described in the present disclosure may be rearranged as long as there is no conflict. For example, the method described in the present disclosure presents the elements of the various steps using an exemplary sequence and is not limited to the particular sequence presented.

The specific operation that is performed by the base station in the present disclosure may be performed by its upper node in some cases. It is apparent that in a network consisting of one or more network nodes having a base station, the various operations performed for communication with the terminal may be performed by at least one of the base station and other network nodes (Examples include, but are not limited to, MME or S-GW.) other than the base station. In the above, an example in which there is one network node other than the base station is explained; however, a combination of a plurality of other network nodes (for example, MME and S-GW) may be used.

Information and signals (information, etc.) can be output from the upper layer (or lower layer) to the lower layer (or upper layer). It may be input and output via a plurality of network nodes.

The input/output information can be stored in a specific location (for example, a memory) or can be managed in a management table. The input/output information can be overwritten, updated, or added. The information can be deleted after outputting. The inputted information can be transmitted to another device.

The determination may be based on a value represented by a single bit (0 or 1), a true or false value (Boolean: true or false), or a numerical comparison (For example, comparison with a given value).

Each of the embodiments/embodiments described in the present disclosure may be used alone, in combination, or alternatively with execution. In addition, notification of predetermined information (for example, notification of "being X") is not limited to being performed explicitly, it may be performed implicitly (for example, without notifying the predetermined information).

Instead of being referred to as software, firmware, middleware, microcode, hardware description language, or some other name, software should be interpreted broadly to mean instruction, instruction set, code, code segment, program code, program, subprogram, software module, application, software application, software package, routine, subroutine, object, executable file, execution thread, procedure, function, and the like.

Further, software, instruction, information, and the like may be transmitted and received via a transmission medium. For example, when software is transmitted from a website, server, or other remote source using at least one of wire technology (Coaxial, fiber-optic, twisted-pair, or digital subscriber line (DSL)) and wireless technology (Infrared, microwave, etc.), at least one of these wire technology and wireless technology is included within the definition of a transmission medium.

Information, signals, or the like mentioned above may be represented by using any of a variety of different technologies. For example, data, instructions, commands, information, signals, bits, symbols, chips, etc. that may be referred to throughout the above description may be represented by voltage, current, electromagnetic waves, magnetic fields or magnetic particles, light fields or photons, or any combination thereof.

The terms described in the present disclosure and those necessary for understanding the present disclosure may be replaced with terms having the same or similar meanings. For example, at least one of a channel and a symbol may be a signal (signaling). The signal may also be a message. Also, a signal may be a message. Further, a component carrier (Component Carrier: CC) may be referred to as a carrier frequency, a cell, a frequency carrier, or the like.

The terms "system" and "network" used in the present disclosure can be used interchangeably.

Furthermore, the information, the parameter, and the like explained in the present disclosure can be represented by an absolute value, can be expressed as a relative value from a predetermined value, or can be represented by corresponding other information. For example, the radio resource can be indicated by an index.

The name used for the above parameter is not a restrictive name in any respect. In addition, formulas and the like using these parameters may be different from those explicitly disclosed in the present disclosure. Because the various channels (for example, PUCCH, PDCCH, or the like) and information element can be identified by any suitable name, the various names assigned to these various channels and information elements shall not be restricted in any way.

In the present disclosure, it is assumed that "base station (Base Station: BS)," "radio base station," "fixed station," "NodeB," "eNodeB (eNB)," "gNodeB (gNB)," "access point," "transmission point," "reception point," "transmission/reception point," "cell," "sector," "cell group," "carrier," "component carrier," and the like can be used interchangeably. The base station may also be referred to with the terms such as a macro cell, a small cell, a femtocell, or a pico cell.

The base station may contain one or more (For example, three) cells, also called sectors. In a configuration in which the base station accommodates a plurality of cells, the entire coverage area of the base station can be divided into a plurality of smaller areas. In each such a smaller area, communication service can be provided by a base station subsystem (for example, a small base station for indoor use (Remote Radio Head: RRH)).

The term "cell" or "sector" refers to a base station performing communication services in this coverage and a portion or the entire coverage area of at least one of the base station subsystems.

In the present disclosure, the terms "mobile station (Mobile Station: MS)," "user terminal," "user equipment (User Equipment: UE)," "terminal" and the like can be used interchangeably.

A mobile station may also be referred to by one of ordinary skill in the art as a subscriber station, mobile unit, subscriber unit, wireless unit, remote unit, mobile device, wireless device, radio communication device, remote device, mobile subscriber station, access terminal, mobile terminal, wireless terminal, remote terminal, handset, user agent, mobile client, client, or some other appropriate term.

At least one of a base station and a mobile station may be called a transmitting device, a receiving device, a communication device, or the like. Note that, at least one of a base station and a mobile station may be a device mounted on a moving body, a moving body itself, or the like. The mobile may be a vehicle (For example, cars, planes, etc.), an unmanned mobile (For example, drones, self-driving cars,), or a robot (manned or unmanned). At least one of a base station and a mobile station can be a device that does not necessarily move during the communication operation. For example, at least one of a base station and a mobile station may be an Internet of Things (IoT) device such as a sensor.

The base station in the present disclosure may be read as a mobile station (user terminal, hereinafter the same). For example, each aspect/embodiment of the present disclosure may be applied to a configuration in which communication between a base station and a mobile station is replaced by communication between a plurality of mobile stations (For example, it may be called device-to-device (D2D), vehicle-to-everything (V2X), etc.). In this case, the mobile station may have the function of the base station. Further, words such as "up" and "down" may be replaced with words corresponding to communication between terminals (For example, "side"). For example, terms an uplink channel, a downlink channel, or the like may be read as a side channel.

Similarly, the mobile station in the present disclosure may be replaced with a base station. In this case, the base station may have the function of the mobile station.

The radio frame may be composed of one or more frames in the time domain. Each frame or frames in the time domain may be called a subframe.

The subframes may also be composed of one or more slots in the time domain. The subframes may be of a fixed time length (For example, 1 ms) independent of numerology.

The numerology may be a communication parameter applied to at least one of the transmission and reception of a signal or channel. The numerology can include one among, for example, subcarrier spacing (SubCarrier Spacing: SCS), bandwidth, symbol length, cyclic prefix length, transmission time interval (Transmission Time Interval: TTI), number of symbols per TTI, radio frame configuration, a specific filtering process performed by a transceiver in the frequency domain, a specific windowing process performed by a transceiver in the time domain, and the like.

The slot may consist of one or more symbols (Orthogonal Frequency Division Multiplexing (OFDM)) symbols, Single Carrier Frequency Division Multiple Access (SC-FDMA) symbols, etc., in the time domain. A slot may be a unit of time based on the numerology.

A slot may include a plurality of minislots. Each minislot may consist of one or more symbols in the time domain. A minislot may also be called a subslot. A minislot may be composed of fewer symbols than slots. PDSCH (or PUSCH) transmitted in units of time greater than the minislot may be referred to as PDSCH (or PUSCH) mapping type A. PDSCH (or PUSCH) transmitted using the minislot may be referred to as PDSCH (or PUSCH) mapping type B.

Each of the radio frame, subframe, slot, minislot, and symbol represents a time unit for transmitting a signal. Different names may be used for the radio frame, subframe, slot, minislot, and symbol.

For example, one subframe may be referred to as a transmission time interval (TTI), a plurality of consecutive subframes may be referred to as a TTI, and one slot or minislot may be referred to as a TTI. That is, at least one of the subframes and the TTI may be a subframe in an existing LTE (1 ms), a period shorter than 1 ms (For example, 1-13 symbols), or a period longer than 1 ms. Note that, a unit representing TTI may be called a slot, a minislot, or the like instead of a subframe.

Here, TTI refers to the minimum time unit of scheduling in radio communication, for example. Here, TTI refers to the minimum time unit of scheduling in radio communication, for example. For example, in the LTE system, the base station performs scheduling for allocating radio resources (frequency bandwidth, transmission power, etc. that can be used in each user terminal) to each user terminal in units of TTI. The definition of TTI is not limited to this.

The TTI may be a transmission time unit such as a channel-encoded data packet (transport block), a code block, or a code word, or may be a processing unit such as scheduling or link adaptation. When TTI is given, a time interval (for example, the number of symbols) in which a transport block, a code block, a code word, etc. are actually mapped may be shorter than TTI.

When one slot or one minislot is called a TTI, one or more TTIs (That is, one or more slots or one or more minislots) may be the minimum time unit for scheduling. The number of slots constituting the minimum time unit for scheduling (the number of minislots) may be controlled.

TTI having a time length of 1 ms may be referred to as an ordinary TTI (TTI in LTE Rel. 8-12), a normal TTI, a long TTI, a normal subframe, a normal subframe, a long subframe, a slot, and the like. TTIs shorter than the normal TTI may be referred to as shortened TTI, short TTI, partial or fractional TTI, shortened subframe, short subframe, minislot, subslot, slot, etc.

In addition, a long TTI (for example, ordinary TTI, subframe, etc.) may be read as TTI having a time length exceeding 1 ms, and a short TTI (for example, shortened TTI) may be read as TTI having TTI length of less than the TTI length of the long TTI but TTI length of 1 ms or more.

A resource block (RB) is a time domain and frequency domain resource allocation unit and may include one or more consecutive subcarriers in the frequency domain. The number of subcarriers included in RB may be, for example, twelve, and the same regardless of the topology. The number of subcarriers included in the RB may be determined based on the neurology.

The time domain of the RB may also include one or more symbols and may be one slot, one minislot, one subframe, or one TTI in length. The one TTI, one subframe, and the like may each consist of one or more resource blocks.

The one or more RBs may be called physical resource blocks (PRBs), sub-carrier groups (SCGs), resource element groups (REGs), PRB pairs, RB pairs, and the like.

The resource block may be composed of one or more resource elements (REs). For example, one RE may be a radio resource area of one subcarrier and one symbol.

A bandwidth part (BWP) (which may be called a partial bandwidth, etc.) may represent a subset of contiguous common resource blocks (RBs) for a certain neurology in a certain carrier. Here, the common RB may be specified by the index of the RB relative to the common reference point of the carrier. PRB may be defined in BWP and numbered within that BWP.

BWP may include UL BWP (UL BWP) and DL BWP (DL BWP). For the UE, one or more BWPs may be set in one carrier.

At least one of the configured BWPs may be active, and the UE may not expect to send and receive certain signals/channels outside the active BWP. Note that "cell," "carrier," and the like in this disclosure may be read as "BWP."

The above-described structures such as a radio frame, subframe, slot, minislot, and symbol are merely examples. For example, the number of subframes included in the radio frame, the number of slots per subframe or radio frame, the number of minislots included in the slot, the number of symbols and RBs included in the slot or minislot, the number of subcarriers included in the RB, and the number of symbols in the TTI, the symbol length, the cyclic prefix (CP) length, and the like can be varied.

The terms "connected" and "coupled," or any variation thereof, mean any direct or indirect connection or coupling between two or more elements and can include the presence of one or more intermediate elements between two elements "connected" or "coupled" to each other. The connection or coupling between elements may be physical, logical, or a combination thereof. For example, "connection" may be read as "access." As used in the present disclosure, the two elements can be considered to be "connected" or "coupled" to each other using at least one of one or more wire, cable, and printed electrical connections and, as some non-limiting and non-inclusive examples, electromagnetic energy having wavelengths in the radio frequency, microwave, and optical (both visible and invisible) regions.

The reference signal may be abbreviated as Reference Signal (RS) and may be called pilot (Pilot) according to applicable standards.

As used in the present disclosure, the phrase "based on" does not mean "based only on" unless explicitly stated otherwise. In other words, the phrase "based on" means both "based only on" and "based at least on."

The "means" in the configuration of each apparatus may be replaced with "unit," "circuit," "device," and the like.

No reference to elements using designations such as "first" and "second" as used in the present disclosure generally limits the quantity or order of those elements. Such designations can be used in the present disclosure as a convenient way to distinguish between two or more elements. Accordingly, reference to the first and second elements does not imply that only two elements may be employed therein, or that the first element must in any way precede the second element.

In the present disclosure, the used terms "include," "including," and variants thereof are intended to be inclusive in a manner similar to the term "comprising." Furthermore, it is intended that the term "or (or)" as used in the present disclosure is not an exclusive OR.

Throughout this disclosure, for example, during translation, if articles such as a, an, and the in English are added, in this disclosure, these articles shall include plurality of nouns following these articles.

As used in this disclosure, the terms "determining," "judging" and "deciding" may encompass a wide variety of actions. "Judgment" and "decision" includes judging or deciding by, for example, judging, calculating, computing, processing, deriving, investigating, looking up, search, inquiry (e.g., searching in a table, database, or other data structure), ascertaining, and the like. In addition, "judgment" and "decision" can include judging or deciding by receiving (for example, receiving information), transmitting (for example, transmitting information), input (input), output (output), and access (accessing) (e.g., accessing data in a memory). In addition, "judgement" and "decision" can include judging or deciding by resolving, selecting, choosing, establishing, and comparing. In other words, "judgment" and "decision" may include regarding some action as "judgment" and "decision." Moreover, "judgment (decision)" may be read as "assuming," "expecting," "considering," and the like.

In the present disclosure, the term "A and B are different" may mean "A and B are different from each other." It should be noted that the term may mean "A and B are each different from C." Terms such as "leave," "coupled," or the like may also be interpreted in the same manner as "different."

Although the present disclosure has been described in detail above, it will be obvious to those skilled in the art that the present disclosure is not limited to the embodiments described in this disclosure. The present disclosure can be implemented as modifications and variations without departing from the spirit and scope of the present disclosure as defined by the claims. Therefore, the description of the present disclosure is for the purpose of illustration, and does not have any restrictive meaning to the present disclosure.

EXPLANATION OF REFERENCE NUMERALS

10 Radio communication system
20 NG-RAN
100 gNB
110 Reception unit
120 Transmission unit
130 Control unit
200 UE
210 Radio signal transmission and reception unit
220 Amplifier unit
230 Modulation and demodulation unit
240 Control signal and reference signal processing unit
250 Encoding/decoding unit
260 Data transmission and reception unit
270 Control unit
1001 Processor
1002 Memory
1003 Storage
1004 Communication device
1005 Input device
1006 Output device
1007 Bus

The invention claimed is:

1. A terminal comprising:

a receiver configured to receive from a base station, information configuring a wideband carrier bandwidth wider than a maximum carrier bandwidth supported by the terminal; and a controller configured to perform a communication using frequency resources with the maximum carrier bandwidth as an upper limit, the frequency resources allocated within the wideband carrier bandwidth, wherein the wideband carrier bandwidth has a second frequency resource number greater than a first frequency resource number that can be allocated by the base station on an assumption that the terminal uses the wideband carrier bandwidth.

2. The terminal of claim 1, wherein the controller is configured to perform the communication using two or more specific bandwidths in the wideband carrier bandwidth, and each of the two or more specific bandwidths has an upper limit of the maximum carrier bandwidth.

3. The terminal of claim 2, wherein guard bands provided at both ends of each of the two or more specific bandwidths are narrower than existing guard bands.

4. The terminal of claim 1, wherein the controller is configured to perform the communication using two or more specific bandwidths configured as an upper limit of the maximum carrier bandwidth in the broader carrier bandwidth, and the subcarrier spacing applied to each of the two or more specific bandwidths is the same.

5. A base station comprising:

a transmitter configured to transmit to a terminal, information configuring a wideband carrier bandwidth wider than a maximum carrier bandwidth supported by the terminal; and a controller configured to perform a communication using frequency resources with the maximum carrier bandwidth as an upper limit, the frequency resources allocated within the wideband carrier bandwidth, wherein the wideband carrier bandwidth has a second frequency resource number greater than a first frequency resource number that can be allocated by the base station on an assumption that the terminal uses the wideband carrier bandwidth.

6. A radio communication system comprising:

a terminal; and a base station; wherein the terminal is configured to receive from a base station, information configuring a wideband carrier bandwidth wider than a maximum carrier bandwidth supported by the terminal, the terminal is configured to perform a communication using frequency resources with the maximum carrier bandwidth as an upper limit, the frequency resources allocated within the wideband carrier bandwidth, and the wideband carrier bandwidth has a second frequency resource number greater than a first frequency resource number that can be allocated by the base station on an assumption that the terminal uses the wideband carrier bandwidth.

7. A radio communication method comprising:

receiving by a terminal from a base station, information configuring a wideband carrier bandwidth wider than a maximum carrier bandwidth supported by the terminal; and performing by the terminal, a communication using frequency resources with the maximum carrier bandwidth as an upper limit, the frequency resources allocated within the wideband carrier bandwidth, wherein the wideband carrier bandwidth has a second frequency resource number greater than a first frequency resource number that can be allocated by the base station on an assumption that the terminal uses the wideband carrier bandwidth.

* * * * *